(12) United States Patent
Heinz, II et al.

(10) Patent No.: US 9,596,280 B2
(45) Date of Patent: Mar. 14, 2017

(54) MULTIPLE STREAM CONTENT PRESENTATION

(71) Applicant: Amazon Technologies, Inc., Reno, NV (US)

(72) Inventors: Gerard Joseph Heinz, II, Seattle, WA (US); Vinod Murli Mamtani, Bellevue, WA (US); Quais Taraki, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 80 days.

(21) Appl. No.: 14/077,186

(22) Filed: Nov. 11, 2013

(65) Prior Publication Data

US 2015/0134772 A1    May 14, 2015

(51) Int. Cl.
| | | |
|---|---|---|
| *G06F 15/16* | (2006.01) | |
| *H04L 29/06* | (2006.01) | |
| *G06T 11/40* | (2006.01) | |

(52) U.S. Cl.
CPC ............ *H04L 65/60* (2013.01); *G06T 11/40* (2013.01); *H04L 65/1089* (2013.01); *H04L 65/604* (2013.01); *H04L 67/38* (2013.01)

(58) Field of Classification Search
CPC ... H04L 65/60; H04L 65/1089; H04L 65/604; H04L 65/38; G06T 11/40
USPC ........................................ 709/217, 223, 233
See application file for complete search history.

(56) References Cited

U.S. PATENT DOCUMENTS

| | | | |
|---|---|---|---|
| 5,774,668 A | 6/1998 | Choquier et al. | |
| 5,956,489 A | 9/1999 | San Andreas et al. | |
| 6,343,313 B1 * | 1/2002 | Salesky ................ | G06F 3/1415 709/203 |
| 6,525,731 B1 | 2/2003 | Suits et al. | |
| 6,556,206 B1 | 4/2003 | Benson et al. | |
| 6,694,346 B1 | 2/2004 | Aman et al. | |
| 6,941,078 B1 | 9/2005 | Onaka | |
| 7,068,729 B2 | 6/2006 | Shokrollahi et al. | |
| 7,177,448 B1 * | 2/2007 | Sah .............................. | 382/107 |
| 7,249,291 B2 | 7/2007 | Rasmussen et al. | |
| 7,447,235 B2 | 11/2008 | Luby et al. | |
| 7,522,167 B1 | 4/2009 | Diard et al. | |
| 7,548,242 B1 | 6/2009 | Hughes et al. | |
| 7,616,206 B1 | 11/2009 | Danilak | |

(Continued)

FOREIGN PATENT DOCUMENTS

WO    WO 2013/069654 A1    5/2013

OTHER PUBLICATIONS

U.S. Appl. No. 14/317,441, filed Jun. 27, 2014, Kalman et al.

(Continued)

*Primary Examiner* — Thu Ha Nguyen
(74) *Attorney, Agent, or Firm* — Baker & Hostetler LLP

(57) ABSTRACT

A client may, for example, initiate presentation of the content item in a hybrid stream mode in which both a client stream and a content provider stream are combined to form a resulting hybrid stream for presentation. The client may then, at some point during presentation of the content item, detect that the content provider stream has become unavailable. In response to such a determination, the client may continue to present the content item in a client stream mode, in which the client stream is used for presentation of the content item without use of the content provider stream.

18 Claims, 8 Drawing Sheets

(56) References Cited

U.S. PATENT DOCUMENTS

| | | | |
|---|---|---|---|
| 7,616,207 B1 | 11/2009 | Diard et al. | |
| 7,623,131 B1 | 11/2009 | Johnson | |
| 7,660,245 B1 | 2/2010 | Luby | |
| 7,711,068 B2 | 5/2010 | Shokrollahi et al. | |
| 7,720,174 B2 | 5/2010 | Shokrollahi et al. | |
| 7,721,184 B2 | 5/2010 | Luby et al. | |
| 7,956,772 B2 | 6/2011 | Shokrollahi et al. | |
| 7,969,444 B1 | 6/2011 | Biermann et al. | |
| 7,984,179 B1* | 7/2011 | Huang | H04N 21/2662 709/231 |
| 8,065,676 B1 | 11/2011 | Sahai et al. | |
| 8,185,809 B2 | 5/2012 | Luby et al. | |
| 8,190,760 B2* | 5/2012 | Hurst | H04N 21/4325 709/231 |
| 8,279,755 B2 | 10/2012 | Luby | |
| 8,458,567 B2 | 6/2013 | Luby et al. | |
| 8,473,557 B2 | 6/2013 | Ramakrishnan et al. | |
| 8,478,816 B2 | 7/2013 | Parks et al. | |
| 8,484,284 B2 | 7/2013 | Elliott et al. | |
| 8,527,646 B2 | 9/2013 | Khatib et al. | |
| 8,572,251 B2 | 10/2013 | Srinivas et al. | |
| 8,671,163 B2 | 3/2014 | Luby et al. | |
| 8,838,722 B2 | 9/2014 | Ridges et al. | |
| 8,928,659 B2 | 1/2015 | Bar-Zeev et al. | |
| 8,996,864 B2 | 3/2015 | Maigne et al. | |
| 9,192,859 B2 | 11/2015 | Perlman et al. | |
| 2002/0114404 A1 | 8/2002 | Aizawa et al. | |
| 2002/0129159 A1 | 9/2002 | Luby et al. | |
| 2002/0147611 A1 | 10/2002 | Greene et al. | |
| 2002/0173984 A1 | 11/2002 | Robertson et al. | |
| 2002/0176367 A1 | 11/2002 | Gross | |
| 2003/0091000 A1 | 5/2003 | Chu et al. | |
| 2003/0105925 A1 | 6/2003 | Yoshimura et al. | |
| 2003/0212742 A1 | 11/2003 | Hochmuth et al. | |
| 2004/0057379 A1 | 3/2004 | Chen et al. | |
| 2004/0073903 A1 | 4/2004 | Melchione et al. | |
| 2004/0093206 A1 | 5/2004 | Hardwick | |
| 2004/0098748 A1 | 5/2004 | Bo et al. | |
| 2004/0101274 A1 | 5/2004 | Foisy et al. | |
| 2004/0153316 A1 | 8/2004 | Hardwick | |
| 2005/0135305 A1 | 6/2005 | Wentink | |
| 2006/0036756 A1* | 2/2006 | Driemeyer et al. | 709/231 |
| 2006/0061651 A1 | 3/2006 | Tetterington | |
| 2006/0072831 A1 | 4/2006 | Pallister | |
| 2006/0088093 A1 | 4/2006 | Lakaniemi et al. | |
| 2006/0168147 A1* | 7/2006 | Inoue | A63F 13/12 709/219 |
| 2007/0009043 A1 | 1/2007 | Craig et al. | |
| 2007/0053692 A1 | 3/2007 | Hoshida et al. | |
| 2007/0094094 A1 | 4/2007 | Yaron et al. | |
| 2007/0140359 A1 | 6/2007 | Ehret et al. | |
| 2007/0156725 A1 | 7/2007 | Ehret et al. | |
| 2007/0183493 A1* | 8/2007 | Kimpe | G06F 21/6245 375/240.1 |
| 2007/0226364 A1 | 9/2007 | Landspurg et al. | |
| 2007/0265073 A1 | 11/2007 | Novi et al. | |
| 2008/0008093 A1 | 1/2008 | Wang et al. | |
| 2008/0104608 A1 | 5/2008 | Hyser et al. | |
| 2008/0172140 A1 | 7/2008 | Kim et al. | |
| 2008/0281793 A1 | 11/2008 | Mathur | |
| 2009/0131177 A1 | 5/2009 | Pearce | |
| 2009/0150750 A1 | 6/2009 | Liu et al. | |
| 2009/0195537 A1 | 8/2009 | Qiu et al. | |
| 2009/0245426 A1 | 10/2009 | Ratnakar et al. | |
| 2009/0249440 A1 | 10/2009 | Platt et al. | |
| 2009/0251488 A1 | 10/2009 | Clavel | |
| 2009/0307565 A1 | 12/2009 | Luby et al. | |
| 2010/0017686 A1 | 1/2010 | Luby et al. | |
| 2010/0063992 A1 | 3/2010 | Ma et al. | |
| 2010/0088453 A1 | 4/2010 | Solki et al. | |
| 2010/0156892 A1 | 6/2010 | Chan et al. | |
| 2010/0166058 A1 | 7/2010 | Perlman et al. | |
| 2010/0166063 A1 | 7/2010 | Perlman et al. | |
| 2010/0166065 A1 | 7/2010 | Perlman et al. | |
| 2010/0166068 A1 | 7/2010 | Perlman et al. | |
| 2010/0289803 A1 | 11/2010 | Klosowski et al. | |
| 2010/0312891 A1 | 12/2010 | Pairault et al. | |
| 2011/0002377 A1 | 1/2011 | Raveendran | |
| 2011/0002378 A1 | 1/2011 | Raveendran | |
| 2011/0002379 A1 | 1/2011 | Raveendran | |
| 2011/0002399 A1 | 1/2011 | Raveendran | |
| 2011/0002405 A1 | 1/2011 | Raveendran | |
| 2011/0040894 A1 | 2/2011 | Shrum et al. | |
| 2011/0055372 A1 | 3/2011 | Elyashev et al. | |
| 2011/0055602 A1 | 3/2011 | Kamay et al. | |
| 2011/0125746 A1 | 5/2011 | Leary et al. | |
| 2011/0134111 A1 | 6/2011 | Stone | |
| 2011/0157193 A1 | 6/2011 | Boucher et al. | |
| 2011/0252181 A1 | 10/2011 | Ouye et al. | |
| 2011/0252356 A1 | 10/2011 | Morris | |
| 2011/0276689 A1 | 11/2011 | Rosen | |
| 2011/0283045 A1 | 11/2011 | Krishnan et al. | |
| 2011/0304634 A1* | 12/2011 | Urbach | G06F 9/5016 345/501 |
| 2012/0004040 A1* | 1/2012 | Pereira | A63F 13/77 463/42 |
| 2012/0004041 A1* | 1/2012 | Pereira | A63F 9/24 463/42 |
| 2012/0004042 A1* | 1/2012 | Perry | A63F 13/30 463/42 |
| 2012/0005316 A1* | 1/2012 | Perry | H04L 65/4069 709/219 |
| 2012/0069036 A1 | 3/2012 | Dharmapurikar | |
| 2012/0084774 A1 | 4/2012 | Post et al. | |
| 2012/0089980 A1 | 4/2012 | Sharp et al. | |
| 2012/0093252 A1 | 4/2012 | Strait | |
| 2012/0117145 A1 | 5/2012 | Clift et al. | |
| 2012/0141089 A1 | 6/2012 | Hunt | |
| 2012/0173715 A1 | 7/2012 | Selister et al. | |
| 2012/0182387 A1 | 7/2012 | Enenkl et al. | |
| 2012/0188341 A1 | 7/2012 | Klien et al. | |
| 2012/0192031 A1 | 7/2012 | Liu et al. | |
| 2012/0206572 A1 | 8/2012 | Russell | |
| 2012/0209933 A1 | 8/2012 | Ridges et al. | |
| 2012/0224490 A1 | 9/2012 | Ikada | |
| 2012/0268553 A1* | 10/2012 | Talukder | H04L 12/1818 348/14.08 |
| 2012/0281962 A1 | 11/2012 | Hunt et al. | |
| 2012/0331147 A1 | 12/2012 | Dutta et al. | |
| 2013/0007499 A1 | 1/2013 | Moy | |
| 2013/0016107 A1 | 1/2013 | Dharmapurikar | |
| 2013/0024812 A1 | 1/2013 | Reeves et al. | |
| 2013/0031161 A1 | 1/2013 | Yang | |
| 2013/0036476 A1 | 2/2013 | Roever et al. | |
| 2013/0038618 A1 | 2/2013 | Urbach | |
| 2013/0106855 A1 | 5/2013 | Urbach | |
| 2013/0151683 A1 | 6/2013 | Jain et al. | |
| 2013/0151803 A1 | 6/2013 | Tofano | |
| 2013/0210522 A1 | 8/2013 | Dharmapurikar | |
| 2013/0322517 A1 | 12/2013 | Zurpal et al. | |
| 2013/0326024 A1 | 12/2013 | Chen et al. | |
| 2013/0344960 A1* | 12/2013 | Perry | A63F 13/12 463/32 |
| 2013/0344961 A1 | 12/2013 | Iannetta | |
| 2013/0344966 A1 | 12/2013 | Mustafa | |
| 2014/0025710 A1 | 1/2014 | Sarto | |
| 2014/0108967 A1* | 4/2014 | Markham | A63F 13/42 715/757 |
| 2014/0143301 A1 | 5/2014 | Watson et al. | |
| 2014/0171186 A1 | 6/2014 | Arnone et al. | |
| 2014/0173060 A1 | 6/2014 | Jubran et al. | |
| 2014/0173674 A1 | 6/2014 | Wolman et al. | |
| 2014/0176583 A1 | 6/2014 | Abiezzi et al. | |
| 2014/0267283 A1 | 9/2014 | Nystad et al. | |
| 2014/0279581 A1 | 9/2014 | Devereaux et al. | |
| 2014/0297798 A1* | 10/2014 | Bakalash et al. | 709/217 |
| 2014/0337835 A1 | 11/2014 | Johnson | |
| 2015/0019965 A1 | 1/2015 | Roberts et al. | |
| 2015/0084981 A1 | 3/2015 | Clarberg | |
| 2015/0091903 A1 | 4/2015 | Costello et al. | |
| 2015/0130789 A1 | 5/2015 | Heinz et al. | |
| 2015/0130813 A1 | 5/2015 | Taraki et al. | |
| 2015/0130814 A1 | 5/2015 | Taraki et al. | |

(56) References Cited

U.S. PATENT DOCUMENTS

| | | |
|---|---|---|
| 2015/0130815 A1 | 5/2015 | Taraki et al. |
| 2015/0131969 A1 | 5/2015 | Taraki et al. |
| 2015/0133214 A1 | 5/2015 | Heath et al. |
| 2015/0133215 A1 | 5/2015 | Heinz et al. |
| 2015/0133216 A1 | 5/2015 | Heinz et al. |
| 2015/0134770 A1 | 5/2015 | Heinz et al. |
| 2015/0134771 A1 | 5/2015 | Kalman et al. |
| 2015/0134779 A1 | 5/2015 | Thompson et al. |
| 2015/0134840 A1 | 5/2015 | Thompson et al. |
| 2015/0142925 A1* | 5/2015 | Hix et al. .................. 709/219 |
| 2015/0200983 A1* | 7/2015 | Pearce ............... H04L 65/403 709/205 |
| 2015/0249623 A1* | 9/2015 | Phillips ............. H04L 65/4084 709/219 |
| 2015/0331813 A1* | 11/2015 | Perrin .................. G06F 13/00 345/522 |

OTHER PUBLICATIONS http://commons.wikimedia.org/wiki/File:Stereoscopic_3D_render_from_Blender.jpg; File: Stereoscopic 3D render from Blender.jpg; Wikimedia; Mar. 4, 2012; accessed Nov. 12, 2013; 2 pages.

http://en.wikipedia.org/wiki/Mipmap; Mipmap; Wikipedia; Oct 29, 2013; accessed Nov. 10, 2013; 3 pages.

http://en.wikipedia.org/wiki/Texture_atlas; Texture atlas; Wikipedia; Sep. 28, 2013; accessed Nov. 10, 2013; 2 pages.

http://msdn.microsoft.com/en-us/library/windows/hardware/ff569022(v=vs.85).aspx; Pipelines for Direct3D Verison 11: Microsoft; Oct. 14, 2013; accessed Nov. 9, 2013; 3 pages.

* cited by examiner

MULTIPLE STREAM CONTENT PRESENTATION

CROSS REFERENCE TO RELATED APPLICATIONS

This application is related to the following applications, each of which is hereby incorporated by reference in its entirety: U.S. patent application Ser. No. 14/076,718 filed Nov. 11, 2013, entitled "VIDEO ENCODING BASED ON AREAS OF INTEREST"; U.S. patent application Ser. No. 14/076,821 filed Nov. 11, 2013, entitled "ADAPTIVE SCENE COMPLEXITY BASED ON SERVICE QUALITY"; U.S. patent application Ser. No. 14/077,127 filed Nov. 11, 2013, entitled "SERVICE FOR GENERATING GRAPHICS OBJECT DATA"; U.S. patent application Ser. No. 14/077,136 filed Nov. 11, 2013, entitled "IMAGE COMPOSITION BASED ON REMOTE OBJECT DATA"; U.S. patent application Ser. No. 14/077,165 filed Nov. 11, 2013, entitled "MULTIPLE PARALLEL GRAPHICS PROCESSING UNITS"; U.S. patent application Ser. No. 14/077,084 filed Nov. 11, 2013, entitled "ADAPTIVE CONTENT TRANSMISSION"; U.S. patent application Ser. No. 14/077,180 filed Nov. 11, 2013, entitled "VIEW GENERATION BASED ON SHARED STATE"; U.S. patent application Ser. No. 14/077,149 filed Nov. 11, 2013, entitled "DATA COLLECTION FOR MULTIPLE VIEW GENERATION"; U.S. patent application Ser. No. 14/077,142 filed Nov. 11, 2013, entitled "STREAMING GAME SERVER VIDEO RECORDER"; U.S. patent application Ser. No. 14/076,815 filed Nov. 11, 2013, entitled "LOCATION OF ACTOR RESOURCES"; U.S. patent application Ser. No. 14/077,146 filed Nov. 11, 2013, entitled "SESSION IDLE OPTIMIZATION FOR STREAMING SERVER"; U.S. patent application Ser. No. 14/077,023 filed Nov. 11, 2013, entitled "APPLICATION STREAMING SERVICE"; U.S. Patent Application No. 61/902,740 filed Nov. 11, 2013, entitled "EFFICIENT BANDWIDTH ESTIMATION".

BACKGROUND

Recent technological advances have improved the ability to transmit and deliver information in a fast and efficient manner. In accordance with such advances, it is becoming increasingly popular to acquire and store data at a central provider location and to deliver the data to end users quickly upon request. This model may employ technological concepts such as multimedia streaming, in which multimedia content may be constantly received by and presented to an end user while being delivered by a provider. One rapidly expanding area is the use of streaming technology to deliver content, such as video games. When streaming content, a provider may access the requested content, render the content from scenes into images, and then encode and transmit the images to a client over a network such as the Internet.

While streaming and other content delivery technology provides many benefits, it may also involve a number of drawbacks. For example, streaming and other content delivery technology may require a client to maintain a constant connection to the provider for the entire duration of a streaming or other content delivery session. The need for such a constant connection may, for example, be undesirable for clients that would need or like to change locations during a content delivery session. Such a change in location may cause the client to pass through or relocate to an area with poor connectivity to the provider, thereby interrupting and perhaps terminating the content delivery session. In some cases, even if a client is not changing location, changing network conditions at a fixed location may also reduce connectivity and potentially negatively impact or terminate content delivery.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION

In general, this disclosure describes techniques for multiple stream content presentation. In accordance with the disclosed techniques, multiple content streams may be employed in association with presentation of a content item such as a video game. For example, the multiple content streams may include a client stream and a content provider stream. In some cases, the client stream may be rendered based at least in part on a client content item version installed on the client device, while the content provider stream may be rendered based at least in part on a content provider content item version executed by a content provider. The content provider stream may, for example, be transmitted from the content provider to the client using an electronic network such as the Internet.

In some cases, a client may establish a connection with a content provider prior to or shortly after initiating presentation of a content item. In such cases, the client may, for example, initiate presentation of the content item in a hybrid stream mode in which both the client stream and the content provider stream are combined to form a resulting hybrid stream for presentation. The client may then, at some point during presentation of the content item, detect that the content provider stream has become unavailable. In response to such a determination, the client may continue to present the content item in a client stream mode, in which the client stream is used for presentation of the content item without use of the content provider stream. In some cases, upon detecting that the content provider stream has again become available, the client may switch back into the hybrid stream mode and once again use both the client stream and the content provider stream for presentation.

In some cases, the client stream may, for example, include features of higher importance, while the content provider stream may, for example, include features of lower importance. Also, in some cases, the client stream may, for example, include a base feature set, while the content provider stream may, for example, include an optional feature set. The client stream may, for example, include at least enough features such that the client stream alone would allow the content item to be at least temporarily presented without the need to be paused or restarted. In some cases, the client stream may include lower intricacy versions of one or more objects, while the content provider stream may include higher intricacy versions of one or more objects. This may, for example, allow various objects to appear more realistic and/or more detailed when the content provider stream is included in a resulting presentation stream.

Figure 1:
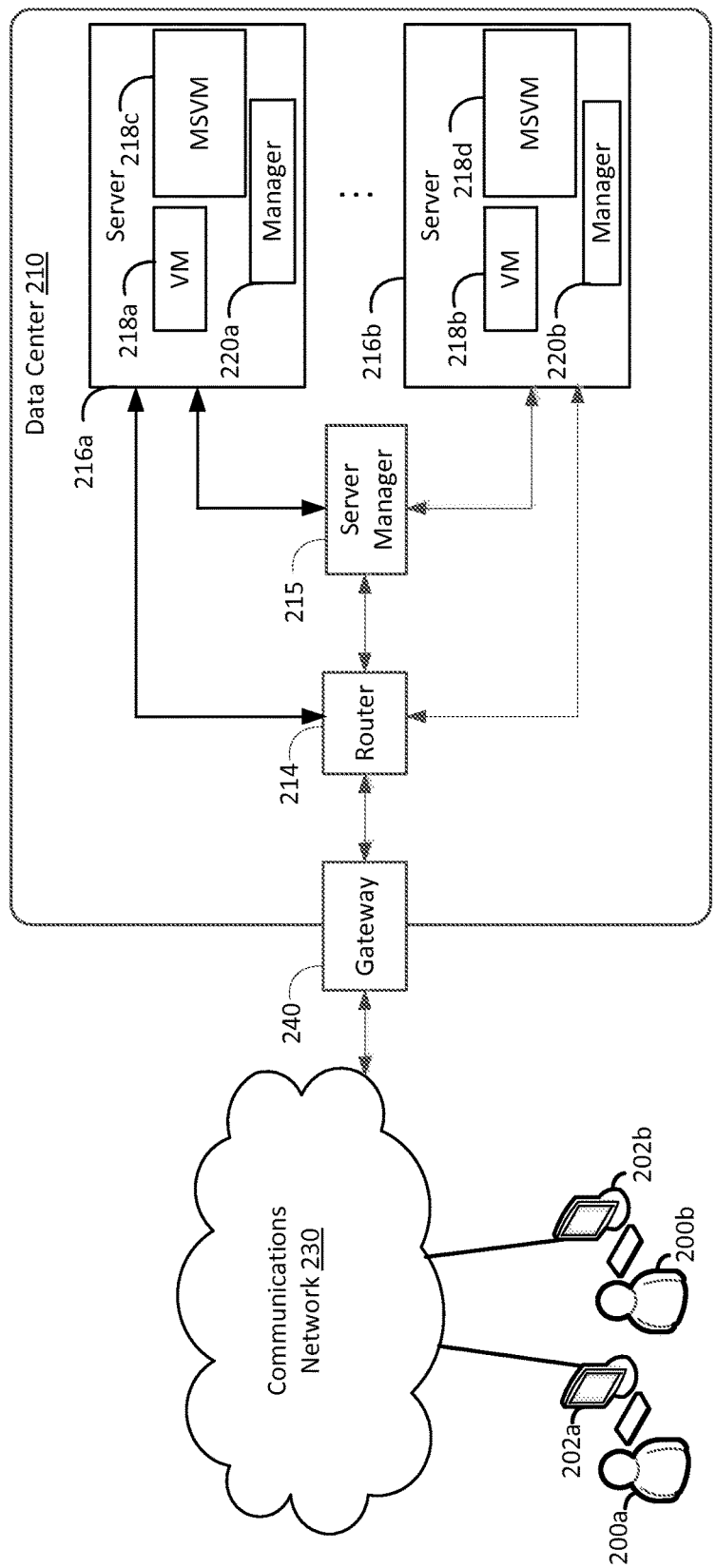
FIG. 1 is a diagram illustrating an example computing system that may be used in some embodiments.

A content provider may, in some cases, render and transmit content, including a content provider stream, to clients over an electronic network such as the Internet. Content may, in some cases, be provided upon request to clients using, for example, streaming content delivery techniques. An example computing environment that enables rendering and transmission of content to clients will now be described in detail. In particular, FIG. 1 illustrates an example computing environment in which the embodiments described herein may be implemented. FIG. 1 is a diagram schematically illustrating an example of a data center 210 that can provide computing resources to users 200a and 200b (which may be referred herein singularly as user 200 or in the plural as users 200) via user computers 202a and 202b (which may be referred herein singularly as computer 202 or in the plural as computers 202) via a communications network 230. Data center 210 may be configured to provide computing resources for executing applications on a permanent or an as-needed basis. The computing resources provided by data center 210 may include various types of resources, such as gateway resources, load balancing resources, routing resources, networking resources, computing resources, volatile and non-volatile memory resources, content delivery resources, data processing resources, data storage resources, data communication resources, and the like. Each type of computing resource may be general-purpose or may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility, and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols such as transmission control protocol (TCP) and less reliable transport layer protocols such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 210 may include servers 216a-b (which may be referred herein singularly as server 216 or in the plural as servers 216) that provide computing resources. These resources may be available as bare metal resources, or as virtual machine instances 218a-d and (which may be referred herein singularly as virtual machine instance 218 or in the plural as virtual machine instances 218). Virtual machine instances 218c and 218d are multiple stream virtual machine ("MSVM") instances. The MSVM virtual machine instances 218c and 218d may be configured to perform all or any portion of the techniques for generating a content provider stream for multiple stream presentation in accordance with the present disclosure and described in detail below. As should be appreciated, while the particular example illustrated in FIG. 1 includes one MSVM virtual machine in each server, this is merely an example. A server may include more than one MSVM virtual machine or may not include any MSVM virtual machines.

The availability of virtualization technologies for computing hardware has provided benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that spans multiple distinct physical computing systems.

Referring to FIG. 1, communications network 230 may, for example, be a publicly accessible network of linked networks and possibly operated by various distinct parties, such as the Internet. In other embodiments, communications network 230 may be a private network, such as a corporate or university network that is wholly or partially inaccessible to non-privileged users. In still other embodiments, communications network 230 may include one or more private networks with access to and/or from the Internet.

Communication network 230 may provide access to computers 202. User computers 202 may be computers utilized by users 200 or other customers of data center 210. For instance, user computer 202a or 202b may be a server, a desktop or laptop personal computer, a tablet computer, a wireless telephone, a personal digital assistant (PDA), an e-book reader, a game console, a set-top box or any other computing device capable of accessing data center 210. User computer 202a or 202b may connect directly to the Internet (e.g., via a cable modem or a Digital Subscriber Line (DSL)). Although only two user computers 202a and 202b are depicted, it should be appreciated that there may be multiple user computers.

User computers 202 may also be utilized to configure aspects of the computing resources provided by data center 210. In this regard, data center 210 might provide a gateway or web interface through which aspects of its operation may be configured through the use of a web browser application program executing on user computer 202. Alternately, a stand-alone application program executing on user computer 202 might access an application programming interface (API) exposed by data center 210 for performing the configuration operations. Other mechanisms for configuring the operation of various web services available at data center 210 might also be utilized.

Servers 216 shown in FIG. 1 may be standard servers configured appropriately for providing the computing resources described above and may provide computing resources for executing one or more web services and/or applications. In one embodiment, the computing resources may be virtual machine instances 218. In the example of virtual machine instances, each of the servers 216 may be configured to execute an instance manager 220a or 220b (which may be referred herein singularly as instance manager 220 or in the plural as instance managers 220) capable of executing the virtual machine instances 218. The instance managers 220 may be a virtual machine monitor (VMM) or another type of program configured to enable the execution of virtual machine instances 218 on server 216, for example. As discussed above, each of the virtual machine instances 218 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 210 shown in FIG. 1, a router 214 may be utilized to interconnect the servers 216a and 216b. Router 214 may also be connected to gateway 240, which is connected to communications network 230. Router 214 may be connected to one or more load balancers, and alone or in combination may manage communications within networks in data center 210, for example by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 210 shown in FIG. 1, a server manager 215 is also employed to at least in part direct various communications to, from and/or between servers 216a and 216b. While FIG. 1 depicts router 214 positioned between gateway 240 and server manager 215, this is merely an exemplary configuration. In some cases, for example, server manager 215 may be positioned between gateway 240 and router 214. Server manager 215 may, in some cases, examine portions of incoming communications from user computers 202 to determine one or more appropriate servers 216 to receive and/or process the incoming communications. Server manager 215 may determine appropriate servers to receive and/or process the incoming communications based on factors such as an identity, location or other attributes associated with user computers 202, a nature of a task with which the communications are associated, a priority of a task with which the communications are associated, a duration of a task with which the communications are associated, a size and/or estimated resource usage of a task with which the communications are associated and many other factors. Server manager 215 may, for example, collect or otherwise have access to state information and other information associated with various tasks in order to, for example, assist in managing communications and other operations associated with such tasks.

It should be appreciated that the network topology illustrated in FIG. 1 has been greatly simplified and that many more networks and networking devices may be utilized to interconnect the various computing systems disclosed herein. These network topologies and devices should be apparent to those skilled in the art.

It should also be appreciated that data center 210 described in FIG. 1 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway or other computing device may comprise any combination of hardware or software that can interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Figure 2:
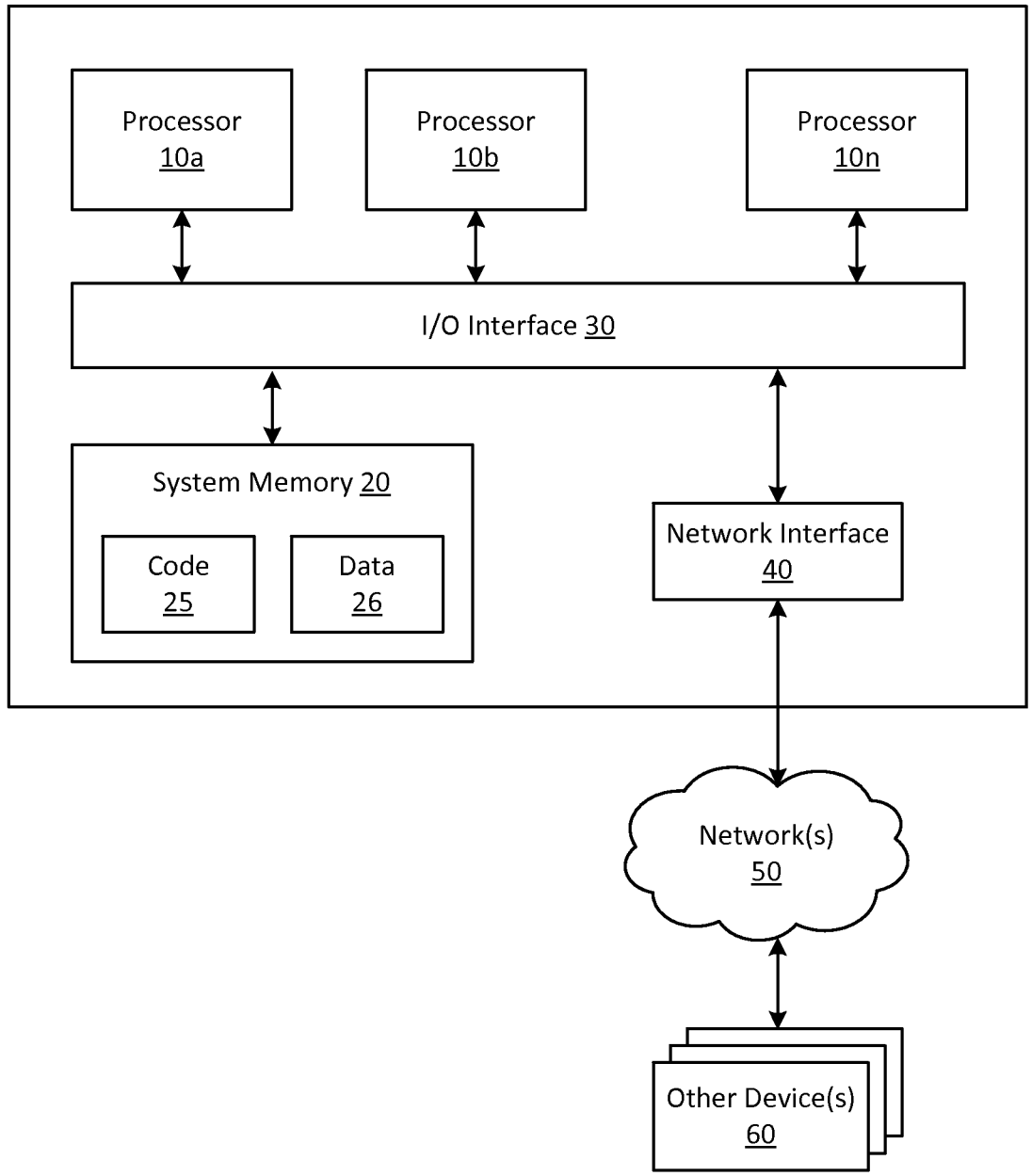
FIG. 2 is a diagram illustrating an example computing system that may be used in some embodiments.

In at least some embodiments, a server that implements a portion or all of one or more of the technologies described herein may include a general-purpose computer system that includes or is configured to access one or more computer-accessible media. FIG. 2 depicts a general-purpose computer system that includes or is configured to access one or more computer-accessible media. In the illustrated embodiment, computing device 100 includes one or more processors 10a, 10b and/or 10n (which may be referred herein singularly as "a processor 10" or in the plural as "the processors 10") coupled to a system memory 20 via an input/output (I/O) interface 30. Computing device 100 further includes a network interface 40 coupled to I/O interface 30.

In various embodiments, computing device 100 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be general-purpose or embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 100 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks such as analog voice networks or digital fiber communications networks, via storage area networks ("SANs") such as Fibre Channel SANs or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 100 via I/O interface 30. A non-transitory computer-accessible storage medium may also include any volatile or non-volatile media such as RAM (e.g. SDRAM, DDR SDRAM, RDRAM, SRAM, etc.), ROM (read only memory) etc., that may be included in some embodiments of computing device 100 as system memory 20 or another type of memory. Further, a computer-accessible medium may include transmission media or signals such as electrical, electromagnetic or digital signals conveyed via a communication medium such as a network and/or a wireless link, such as those that may be implemented via network interface 40. Portions or all of multiple computing devices such as those illustrated in FIG. 2 may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A network set up by an entity such as a company or a public sector organization to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, including general purpose or special purpose computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Figure 3:
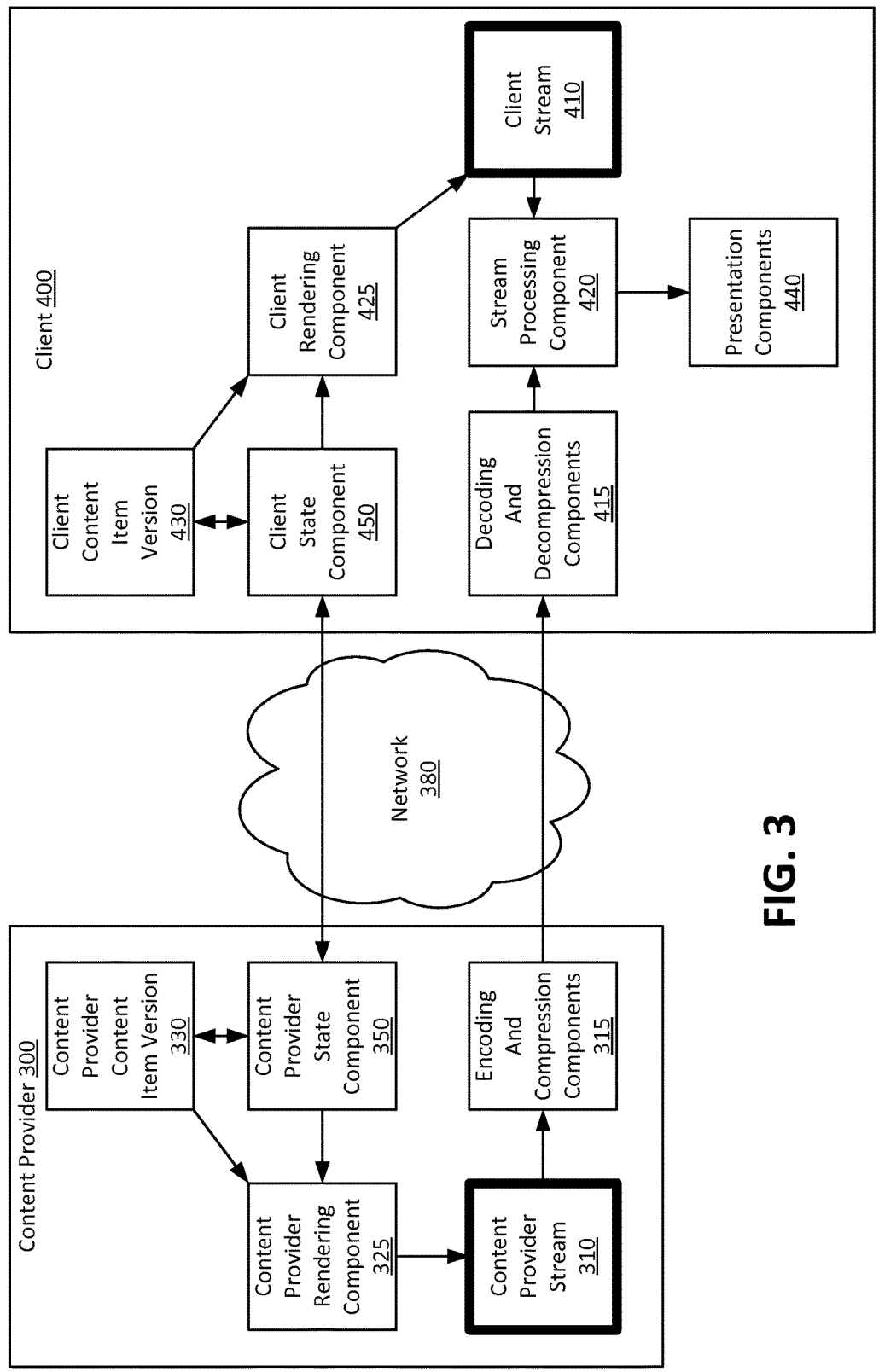
FIG. 3 is a diagram illustrating an example system for content presentation in association with multiple presentation streams in accordance with the present disclosure.

As set forth above, in accordance with the disclosed techniques, a content item may be presented in association with multiple presentation streams. FIG. 3 is a diagram illustrating an example system for content presentation in association with multiple presentation streams in accordance with the present disclosure. As shown in FIG. 3, content provider 300 and client 400 communicate via network 380, which may, in some cases, be an electronic network such as, for example, the Internet or another type of wide area network (WAN) or local area network (LAN). Content provider 300 may, for example, provide one or more content providing services for providing content to clients such as client 400. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, content provider 300 may determine an "edge" of a system or network associated with content providing services that is physically and/or logically closest to client 400. The content provider 300 may then, for example, "spin-up," migrate resources, or otherwise employ components associated with the determined edge for interacting with the client 400. Such an edge determination process may, in some cases, provide an efficient technique for identifying and employing components that are well suited to interact with a particular client 400, and may, in some embodiments, reduce the latency for communications between a content provider 300 and one or more clients.

Client 400 and content provider 300 may, in some cases, communicate for the purposes of having content provider 300 assist with the presentation of a content item at the client 400. The term content, as used herein, refers to any presentable information, and the term content item, as used herein, refers to any collection of any such presentable information. For example, a content item may include graphics content such as a video game. In some cases, a content item may include two-dimensional content, which, as used herein, refers to content that may be represented in accordance with two-dimensional scenes. Also, in some cases, a content item may include three-dimensional content, which, as used herein, refers to content that may be represented in accordance with three-dimensional scenes. The two-dimensional or three-dimensional scenes may be considered logical representations in the sense that they may, for example, not physically occupy the areas that they are intended to logically model or represent. The term scene, as used herein, refers to a representation that may be used in association with generation of an image. A scene may, for example, include or otherwise be associated with information or data that describes the scene. To present a content item, scenes associated with the content item may be used to generate resulting images for display. The images may be generated by way of a process commonly referred to as rendering, which may incorporate concepts such as, for example, projection, reflection, lighting, shading and others. An image may include, for example, information associated with a displayable output, such as information associated with various pixel values and/or attributes.

As shown in FIG. 3, client 400 and content provider 300 each execute a respective version of a content item. In particular, client 400 executes client content item version 430, while content provider 300 executes content provider content item version 330. For purposes of simplification, client content item version 430 and content provider content item version 330 may be referred to collectively as a single content item. Thus, in some cases, a single content item may include two associated versions executing on the client 400 and at the content provider 300. As will be described in greater detail below, client content item version 430 and content provider content item version 430 may, in some cases, be designed to execute in combination with one another such that they may generate complimentary features for one or more images presented at client 400. In some cases, for example, a content creator, such as a company that creates video games, may market and separately distribute separate client and content provider versions of a content item to content providers and to individual clients. In other cases, for example, a content creator may distribute both client and content provider versions to a content provider, and individual clients may then obtain the client version from the content provider or form any number of other additional parties. The client and content provider versions may be distributed using for example, an electronic download, by distributing various forms of storage media and the like.

As should be appreciated, it is not required that client 400 and content provider 300 necessarily execute different versions of a content item. For example, in some cases, client 400 and content provider 300 may execute an identical version of a content item but may access or execute different portions or features of the identical content item version.

Client 400 includes client state component 450, while content provider 300 includes content provider state component 350. In general, client state component 450 and content provider state component 350 may, for example, collect, maintain, store and exchange state information associated with presentation of a content item. Such state information may include, for example, information associated with various features, events, actions or operations associated with the presentation of a content item.

In some cases, client state component 450 may collect state information associated with input provided by a user of client 400. For example, in some cases, client 400 may have control over certain entities associated with the presented content item. Such entities may include, for example, various characters, vehicles, weapons, athletic equipment and the like. For example, video games often allow different participants to control one or more different characters or other entities. Thus, in some cases, client state component 450 may collect state information associated with a character or other entity controlled by client 400. For example, a controlled character may be moved to a new location or perform an action such as firing a weapon or swinging a golf club. State information associated with these example actions may, for example, be collected by client state component 450. Additionally, client state component 450 may collect, for example, information associated with a user selection of a particular entity for control by the user or a user selection to switch control from one entity to another.

State information collected by client state information component 450 is, however, not limited to information associated with user input and/or entities controlled by the client 400. For example, client state information component 450 may also collect state information associated with various features, events, actions or operations associated with client stream 410 or with any other aspect of the presentation of a content item.

Content provider state component 350 may also collect state information associated with presentation of a content item. For example, content provider state information component 350 may collect state information associated with various features, events, actions or operations associated with content provider stream 310 or with any other aspect of the presentation of a content item.

Client state component 450 and content provider state component 350 may, in some cases, periodically exchange state information with another. In some cases, client state component 450 and content provider state component 350 may exchange all or almost all collected state information. However, it is not required that all or almost all collected state information be exchanged between client state component 450 and content provider state component 350. In some cases, client state component 450 may send to content provider state component 350 only a portion of collected state information that is considered to be necessary for the generation of content provider stream 310. Similarly, in some cases, content provider state component 350 may send to client state component 450 only a portion of collected state information that is considered to be necessary for the generation of client stream 410.

State information may, for example, be exchanged between client state component 450 and content provider state component 350 periodically at any desired time or interval. Client state component 450 and content provider state component 350 may, for example, exchange state information simultaneously or using different transmissions to one another at different times. In some cases, client state component 450 and content provider state component 350 may periodically send or exchange updates of state information. Such updates may, for example, include only state information that was not sent in a previous update or transmission, thereby conserving bandwidth by not re-sending information that was sent previously.

In some cases, a presented content item may be presented at multiple clients connected to content provider 300. For example, the presented content item may be a multi-player video game, with multiple different clients each controlling a different respective character in the video game. In such cases, each of the participating client devices may, for example, periodically exchange state information with content provider state component 350. The state information sent from content provider state component 350 to each participating client may then, for example, include state information received from each of the other participating clients.

Client 400 may use client state component 450 in combination with client content item version 430 to provide input to client rendering component 425 for generation of client stream 410. Similarly, content provider 300 may use content provider state component 350 in combination with content provider content item version 330 to content provider rendering component 325 for generation of content provider stream 310. Client rendering component 425 and content provider rendering component 325 may include, for example, a graphics processing unit and the like. Client stream 410 and content provider stream 310 may each include, for example, corresponding images, portions of images, or other information that is usable in association with a resulting display image. For example, in some cases, streams 310 and/or 410 may include information that describes or otherwise corresponds to various features associated with a presentation of a content item. A display image is an image that is displayed by the client 400.

Encoding and compression components 315 may encode and compress content provider stream 310 prior to its transmission to client 400. Encoding and compression components 315 may, for example, include an encoder, a compressor, a codec and the like. Encoding and compression components 315 may generally use any appropriate technique to encode and/or compress content provider stream 310 for transmission to client 400. In some cases, it may not be necessary to encode and/or compress the content provider stream 310. After any necessary encoding and/or compressing operations are performed, content provider stream 310 may be transmitted over network 380 to client 400.

In some cases, content provider stream 310 may be transmitted in accordance with streaming content delivery techniques, in which content may be constantly received and presented by client device 400. Also, in some cases, content provider stream 310 may be transmitted by a dedicated respective server associated with client 400. The use of a separate respective streaming server may be advantageous, for example, because it may, in some cases, enable improved ability to adjust various transmission characteristics to individual clients based on factors such as quality of service associated with a network connection to each client. The adjusted transmission characteristics may include, for example, encoding rates, transmission speed, image quality and other relevant factors. It is noted, however, that the disclosed techniques are not limited to the use of separate servers for transmission to each client. Rather, the disclosed techniques may employ any number of servers each for transmission to any number of different clients. It is also noted that the disclosed techniques are not limited to use with streaming technology and that other content delivery techniques may be employed.

Upon being received by client 400, content provider stream 310 may be decoded and/or decompressed by decoding and decompression components 415. Decoding and decompression components 415 may, for example, include a decoder, a de-compressor, a codec and the like. Decoding and decompression components 315 may generally use any appropriate technique to decode and/or decompress content provider stream 310. As set forth above, in some cases, content provider stream 310 may not be encoded and/or compressed, and, therefore, decoding and/or decompression may be unnecessary.

After any necessary decoding or decompressing, content provider stream 310 may be provided, in combination with client stream 410, to stream processing component 420. Stream processing component 420 may, for example, select various features of one or more of content provider stream 310 and client stream 410 to form a resulting presentation stream. The resulting presentation stream may be presented by presentation components 440, which may include, for example, a display screen, a monitor, audio components such as speakers, control panels and the like.

The term feature, as used herein, refers to any portion of an image or other collection of information. A feature may be, for example, a particular pixel or collection of pixels. A feature may be all or any portion of one or more colors, textures, shapes, patterns or other visual effects. A feature may be, for example, all or any portion of a particular object. A feature may also be, for example, all or any portion of a collection of objects. A feature may be, for example, all or any portion of a particular asset. A feature may also be, for example, all or any portion of a collection of assets. A feature may also be, for example, all or any portion of an entity such as a tree, fire, water, a cloud, a cloth, clothing, a human, an animal and others. For example, a feature may be a portion of a tree or a portion of a cloth. A feature may also, for example, include all or any portion of a collection of objects, entities and/or assets. A feature may also be or include audio information. A feature may also be or include any information that at least in part describes or indicates anything mentioned above in this paragraph.

In some cases, for one or more images displayed at client 400 in association with the presented content item, at least some of the features in an image may be distributed between client stream 410 and content provider stream 310. Features in the client stream 410 may be referred to as client stream features, while features in the content provider stream 310 may be referred to as content provider stream features. Thus, for example, a particular image or other portion of information from client stream 410 may be combined with a counterpart image or other portion of information from content provider stream 310 to form a resulting image for display at client 400. In some cases, in addition to video features, client stream 410 and/or content provider stream 310 may also include or indicate audio features.

In some cases, client stream 410 and content provider stream 310 may not be precisely synchronized with one another with respect to a time at which each stream is received by stream processing component 420. For example, in some cases, an image in content provider stream 310 may be received by stream processing component 420 either before or after receiving a counterpart image from client stream 410. This lack of precise synchronization may be due to factors such as network latency or processing latency at client 400 and/or content provider 300. One or more synchronization techniques may be employed to assist stream combination 420 with identifying counterpart images or image portions in content provider stream 310 and client stream 410. One example synchronization technique may involve assigning identifiers to images or other portions of information in client stream 410 and content provider stream 310. The assigned identifiers may include, for example, sequence identifiers, timestamps and the like. Stream processing component 420 may, for example, identify counterpart images by matching identifiers to images or other portions of information in each of the streams 310 and 410.

As set forth above, in some cases, a connection between client 400 and content provider 300 may become limited or disrupted for certain periods during a presentation of a content item. For example, client 400 may be a mobile device or another transportable device that changes locations during a content presentation session. Such a change in location may cause the client to pass through or relocate to an area with poor quality of service and/or lack of connectivity to the content provider. In some cases, even if client 400 does not change locations, changing network conditions may also potentially reduce quality of service and/or terminate connectivity.

If client 400 becomes disconnected from content provider 300 during a content presentation session, then this may result in a scenario in which content provider stream 310 becomes at least temporarily unavailable to client 400. Additionally, in some cases, even if a connection is maintained, a quality of network service may become so low that content provider stream 310 cannot be received at a necessary quality and/or within a necessary time period for display.

In some cases, when content provider stream 310 becomes at least temporarily unavailable to client 400, stream processing component 420 may pass client stream 410 along to presentation components 440 without any additional features from content provider stream 310. This may, in some cases, be referred to as a client stream operating mode because the resulting presentation stream is based on client stream 410 without additional input from content provider stream 310.

By contrast, in some cases, when content provider stream 310 is available to client 400, stream processing component 420 may combine client stream 410 with content provider stream 310 to form a resulting presentation stream as described above. This may, in some cases, be referred to as a hybrid stream operating mode because the resulting presentation stream is a hybrid stream based on both client stream 410 and content provider stream 310. As should be appreciated, the terms hybrid stream operating mode and client stream operating mode are used herein merely for purposes of simplification and are not meant to imply that a client is necessarily required to employ two distinct modes of operation in association with the combination of client stream 410 and content provider stream 310.

Figure 4:
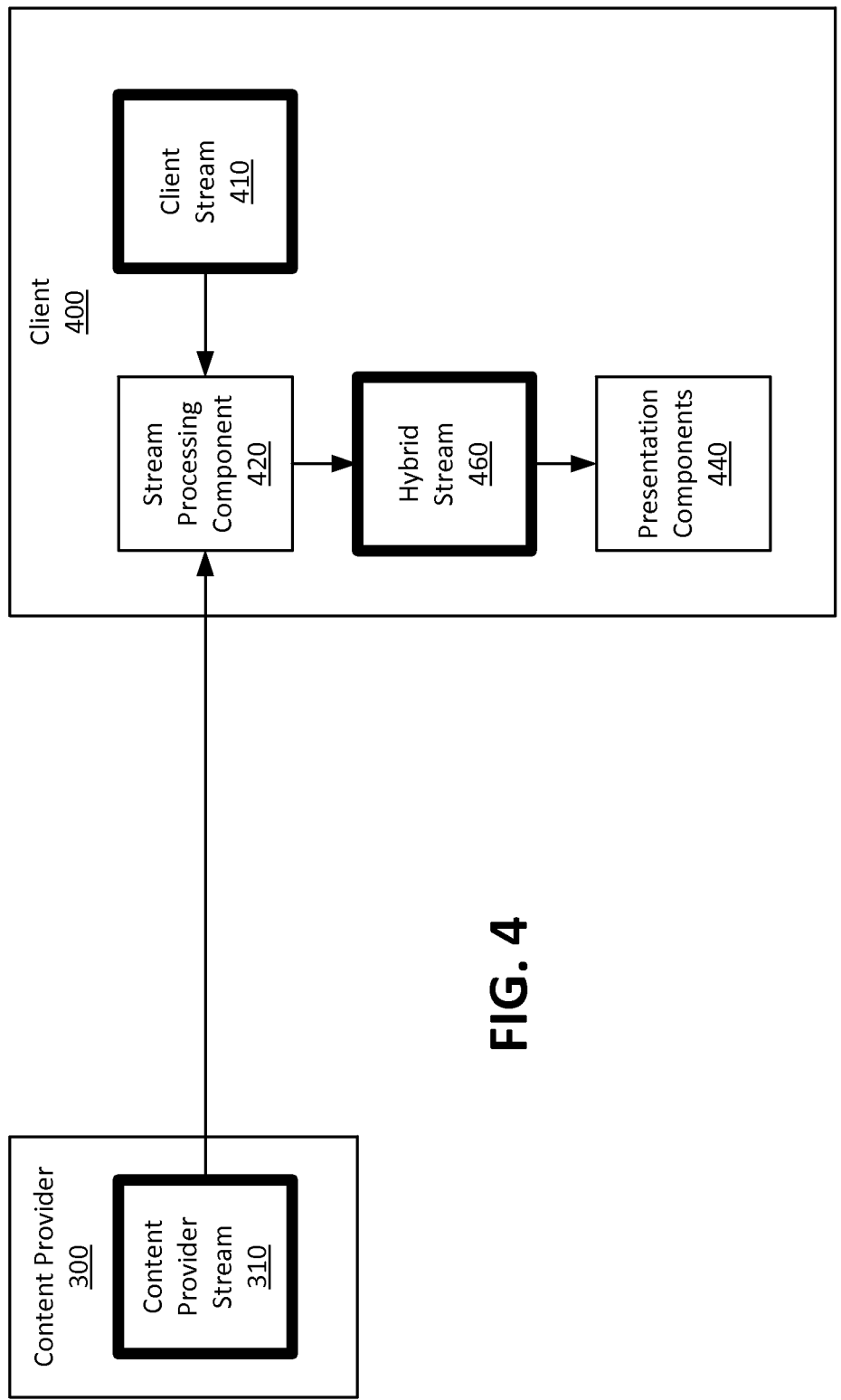
FIG. 4 is a diagram illustrating an example content presentation system operating in the hybrid stream mode in accordance with the present disclosure.

FIG. 4 is a diagram illustrating an example content presentation system operating in the hybrid stream mode in accordance with the present disclosure. As shown in FIG. 4, content provider 300 is connected to client 400, thereby enabling content provider stream 310 to be transmitted to client 400 and made available to stream processing component 420. Stream processing component 420 combines at least some features of content provider stream 310 with at least some features of client stream 410 to form a resulting hybrid stream 460, which is provided to presentation components 440.

Figure 5:
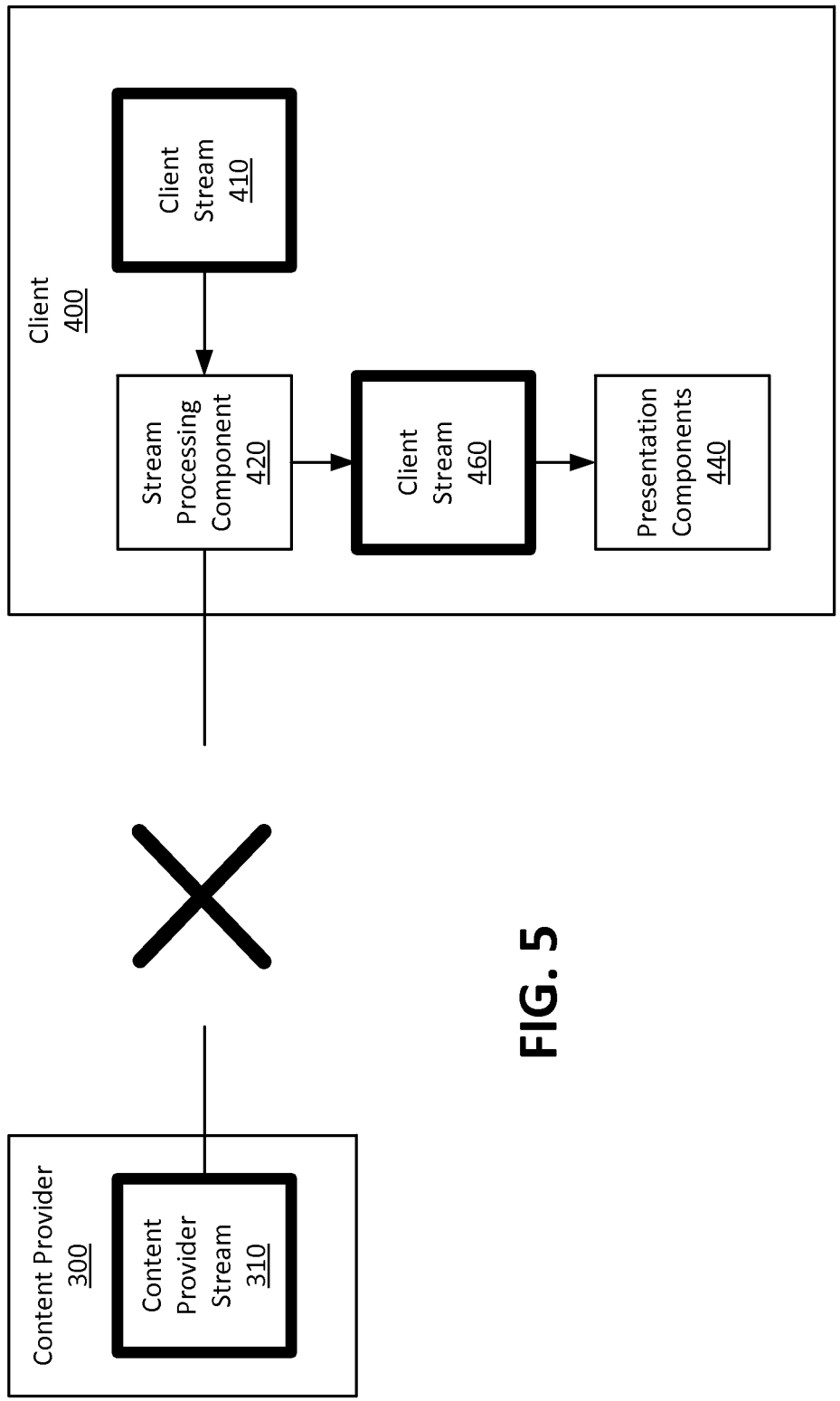
FIG. 5 is a diagram illustrating an example content presentation system operating in the client stream mode in accordance with the present disclosure.

FIG. 5 is a diagram illustrating an example content presentation system operating in the client stream mode in accordance with the present disclosure. As indicated by the bold X shape positioned between client 400 and content provider 300, content provider stream 310 is not available to client 400 in FIG. 5. As set forth above, this may occur, for example, when content provider 300 is not connected to client 400 or when a quality of service associated with a connection between client 400 and content provider 300 drops below a minimum threshold. As shown in FIG. 5, stream processing component 420 may pass client stream 410 along to presentation components 440 without any additional features from content provider stream 310.

Any combination of appropriate techniques may be employed by client 400 to determine when the content provider stream 310 becomes unavailable. For example, in some cases, client 400 may include one or more components that monitor the connection between client 400 and content provider 300. These monitoring components may, in some cases, alert stream processing component 420 when the connection to content provider 300 is terminated or when network quality of service falls below minimum threshold conditions. This may cause stream processing component 420 to at least temporarily operate in the client stream operating mode. Additionally, the monitoring components may, in some cases, alert stream processing component 420 when the connection to content provider 300 is resumed or when network quality of service rises above minimum threshold conditions. This may cause stream processing component 420 to at least temporarily operate in the hybrid stream operating mode.

Also, in some cases, a maximum acceptable delay period may be established for receiving images from content provider 300. For example, when a particular image is received in client stream 410, a timing component may be employed to initiate counting of a delay period for receiving a counterpart image in content provider stream 310. If the counterpart image from content provider stream 310 is received at any point prior to expiration of the delay period, then the counterpart image from the content provider stream may be successfully combined with the image from client stream 410 to form a hybrid image. By contrast, if the counterpart image from content provider stream 310 is not received prior to expiration of the delay period, then content provider stream 310 may be determined to be unavailable, and the image from content stream 410 may be presented without any added features from the content provider 300. As set forth above, a number of techniques, such as sequence identifiers and timestamps, may be employed for identifying counterpart images in content provider stream 310 and client stream 410.

In some cases, features associated with a content item may be distributed between client stream 410 and content provider stream 310 based on a level of importance of the features. For example, client stream 410 may, in some cases, include more important features, while the content provider stream 310 may, in some cases, include less important features. As another example, client stream 410 may, in some cases, include a base feature set, while the content provider stream 310 may, in some cases, include an optional feature set. The client stream 410 may, for example, include at least enough features such that the client stream 410 alone would allow the content item to be at least temporarily presented without the need to be paused or restarted. In some cases, if content provider stream 310 becomes temporarily unavailable during presentation of a content item, it may be desirable to include in client stream 410 at least enough features such that the client stream 410 alone would allow the content item to be at least temporarily presented until content provider stream 310 again becomes available or presentation of the content item is completed.

As an example, for a content item that is a basketball video game, client stream 410 may include features of higher importance such as the active players, the ball and the baskets. By contrast, content provider stream 310 may include features of lower importance such as spectators in the crowd, a scoreboard, various advertising billboards throughout an arena and a bench where reserve players are seated. In this example, if the content provider stream were to become unavailable, the example features in the content provider stream would likely not be required in order to at least temporarily continue playing of the basketball game. By contrast, it would likely be difficult to continue playing of the basketball without the active players, the ball or baskets.

In some cases, features associated with a content item may be distributed between client stream 410 and content provider stream 310 based on a level of intricacy of the features. For example, in some cases, the client stream 410 may include lower intricacy versions of one or more objects, while the content provider stream 310 may include higher intricacy versions of one or more objects. This may, for example, allow various objects to appear more realistic and/or more detailed when the content provider stream 310 is included in a resulting presentation stream. This may also, for example, create an appearance that a level of visibility has increased for a character and/or for one or more portions of an image. For example, client stream 410 may include a cloth that is depicted as a plain color with no pattern or design. By contrast, content provider stream 310 may include the same cloth with an intricate pattern that includes multiple different shapes, textures and colors.

As another example, in some cases, client stream 410 may provide higher levels of detail for foreground objects and lower levels of detail for background objects. By contrast, in some cases, content provider stream may supplement the content stream 310 by providing higher levels of detail for background objects that are not present in the client stream 410. In these cases, when the content provider stream 310 is included in a resulting presentation stream, it may appear as if a distance of visibility from an image viewpoint has increased. By contrast, when the content provider stream 310 is not included in a resulting presentation stream, it may appear as if a distance of visibility from an image viewpoint has decreased.

In some cases, stream processing component 420 or another component may insert certain visual effects in an image or series of images in order to make the inclusion or exclusion of content provider stream 310 appear more natural to a user. For example, in some cases, when content stream 310 is unavailable, a foggy effect may be inserted into an image. As another example, the sun or another light source may become obscured by a cloud or another object.

These visual effects may, in some cases, help to create an impression that there is natural cause within the context of a content item for portions of the displayed output to temporarily appear to be less detailed or less visible.

In some cases, the distribution of features between client stream 410 and/or content provider stream 310 may be adjusted based on state information or any other appropriate information. As an example, a particular video game may include two characters, which will be referred to as a first character and a second character. At the start of the video game presentation, a user at client 400 may select to have control over the first character. An indication of this selection may, for example, be collected by client state component 450 and, in some cases, communicated to content provider state component 350 over network 380, seen in FIG. 3. As a result of this selection, the selected first character may, for example, be included in client stream 410, while the non-selected second character may, for example, be included in content provider stream 310. However, at some subsequent time during the presentation of the video game, the user at client 400 may decide to change the character selection such that the user's control is switched from the first character to the second character. An indication of this change of selection may, for example, be collected by client state component 450 and, in some cases, communicated to content provider state component 350 over network 380. As a result of this change of selection, for subsequently generated images, the selected second character may, for example, be included in client stream 410, while the non-selected first character may, for example, be included in content provider stream 310.

Figure 6:
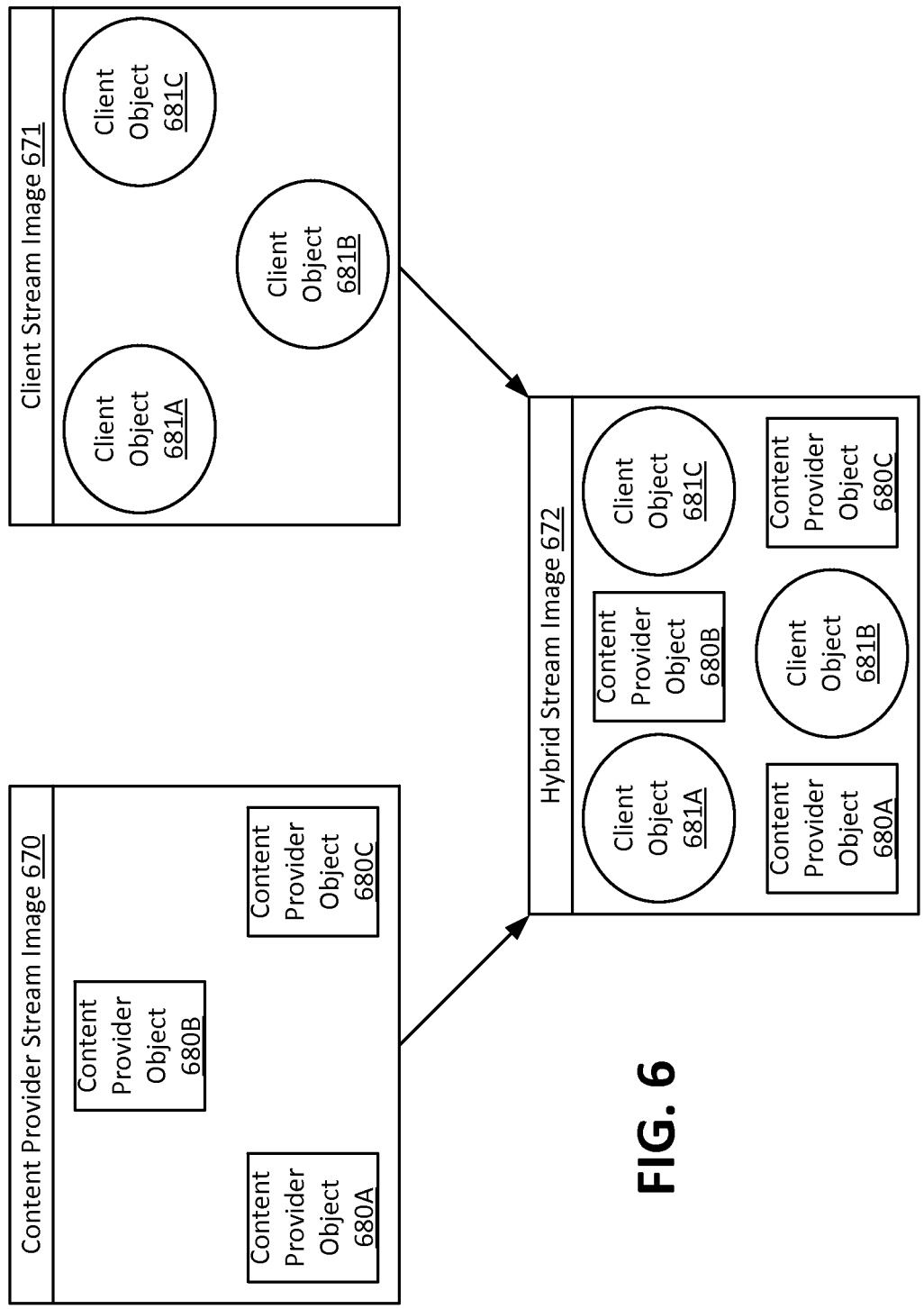
FIG. 6 is a diagram illustrating a first example hybrid stream feature distribution approach that may be used in some embodiments.

Some example hybrid stream feature distribution approaches will now be described in detail with reference to FIGS. 6 and 7. FIG. 6 is a diagram illustrating a first example hybrid stream feature distribution approach that may be used in some embodiments. In particular, FIG. 6 depicts a scenario in which different objects may be included in content provider stream 310 and in client stream 410. As shown in FIG. 6, content provider stream image 670 is combined with a counterpart client stream image 671 to form a hybrid stream image 672. Content provider stream image 670 includes square shaped content provider objects 680A-C. Client stream image 671 includes circle shaped client objects 681A-C. When content provider stream image 670 and client stream image 671 are combined, the resulting hybrid stream image 672 includes both content provider objects 680A-C and client objects 681A-C.

As set forth above, client objects 681A-C may, in some cases, include objects of higher importance within the context of the content item, while content provider objects 680A-C may, in some cases, include objects of lower importance within the context of the content item. For example, client objects 681A-C may, in some cases, include characters or other entities controlled by client 400, while content provider objects 680A-C may, in some cases, include characters or other entities not controlled by client 400. As another example, client objects 681A-C may, in some cases, include certain foreground objects, while content provider objects 680A-C may, in some cases, include certain background objects.

Figure 7:
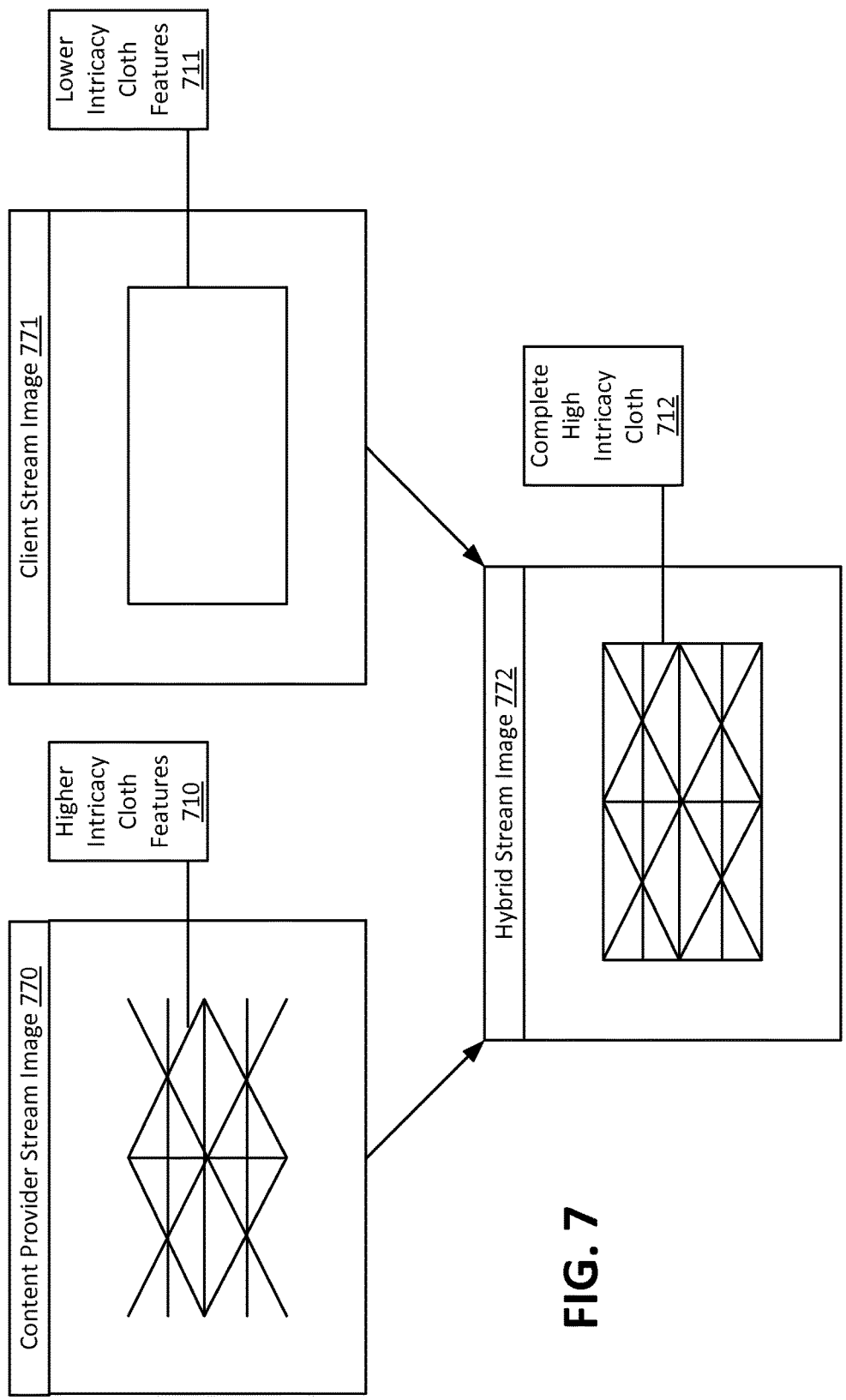
FIG. 7 is a diagram illustrating a second example hybrid stream feature distribution approach that may be used in some embodiments.

FIG. 7 is a diagram illustrating a second example hybrid stream feature distribution approach that may be used in some embodiments. In particular, FIG. 7 depicts a scenario in which versions of the same object with different levels of intricacy may be included in content provider stream 310 and in client stream 410. As shown in FIG. 7, content provider stream image 770 is combined with client stream image 771 to form a hybrid stream image 772. Client stream image 771 includes lower intricacy cloth features 711, while content provider stream image 770 includes higher intricacy cloth features 710. When content provider stream image 770 and client stream image 771 are combined, the resulting hybrid stream image 772 includes a complete higher intricacy cloth 712.

As shown, lower intricacy cloth features 711 include only a single color with no shapes or patterns. By contrast, higher intricacy cloth features 710 include a pattern having various different lines and shapes. Although not shown in FIG. 7, higher intricacy cloth features 710 may also include, for example, various different textures, shading, reflectivity and other details that may not, in some cases, be included in lower intricacy cloth 711.

It is once again noted that each of the above described feature distribution examples between client stream 410 and content provider stream 310 are non-limiting. Any combination of the above described feature distribution examples and any other additional or alternative desired feature distribution examples may be employed in accordance with the present techniques.

Figure 8:
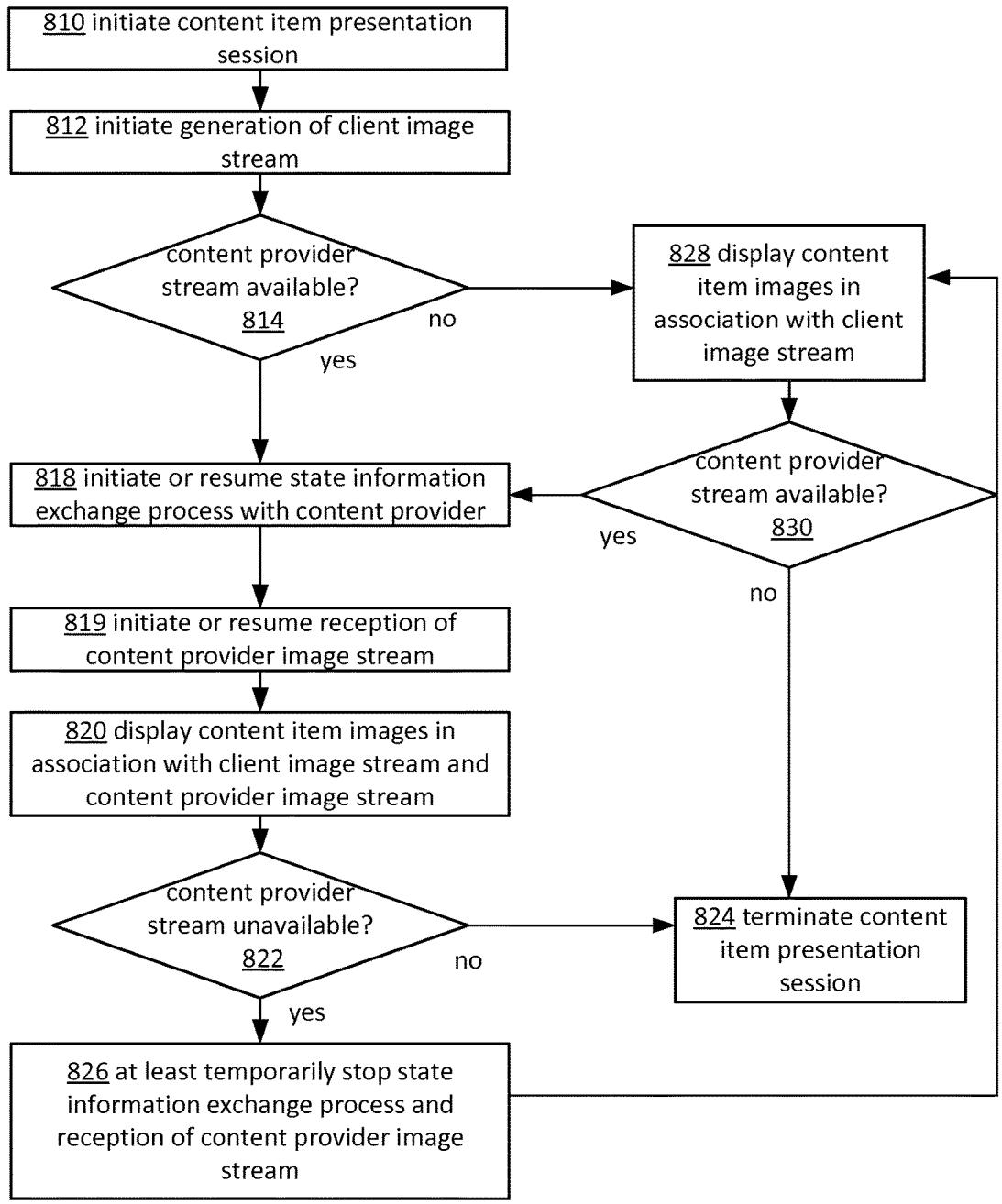
FIG. 8 is a flowchart depicting an example stream combination procedure in accordance with the present disclosure.

FIG. 8 is a flowchart depicting an example multiple stream operating procedure in accordance with the present disclosure. As shown, at operation 810, a content item presentation session is initiated at a client device. The content presentation session may be initiated by, for example, selecting the content item from a folder or menu or otherwise activating the content item. The initiation of the content item presentation session at operation 810 may, for example, trigger execution of a client content item version that is stored at the client device. The initiation of the content item presentation session at operation 810 may also, for example, trigger an attempt by the client to connect to a content provider. In some cases, if a connection is established between the client and the content provider, the client may request that the content provider transmit a content provider stream to the client.

At operation 812, generation of a client stream is initiated. As set forth above, the client stream may include, for example, images or portions of images in association with the presented content item. As set forth above, the client stream may be generated based on, for example, information in the client content item version in combination with state information associated with presentation of the content item. The state information used to generate the client stream may include, for example, state information collected by the client device throughout the presentation of the content item. Also, the state information used to generate the client stream may include, for example, state information received from the content provider as a result of a state information exchange process with the content provider, which is discussed in greater detail below with reference to operation 818. Some example contents of the client stream, as well as some example differences between the contents of the client stream and the content provider stream, are discussed in detail above.

At operation 814, the client device determines whether the content provider stream is available. As set forth above, in some cases, the availability of the content provider stream may be determined, based at least in part, on a determination of whether the client is connected to the content provider. The client and the content provider may, for example, be connected via an electronic network such as the Internet or another WAN or LAN network. As set forth above, in some cases, the client may attempt to establish a connection to the content provider when the content item presentation session is initiated at operation 810. In some cases, the content provider stream may be determined to be unavailable when the client and content provider are not connected. By contrast, in some cases, the content provider stream may be determined to be available when the client and content provider are connected.

Also, in some cases, the availability of the content provider stream may be determined, based at least in part, on a quality associated with a connection between the client and the content provider. The quality of the connection may be determined based on, for example, characteristics such as bandwidth, latency, throughput and the like. In some cases, a threshold level of quality may be determined in association with the content provider stream. For example, the threshold level of quality may sometimes indicate a level of quality that is considered to be sufficient for receiving the content provider stream within a certain time period and/or at certain levels of image quality. In some cases, the content provider stream may be determined to be unavailable when the quality of the connection is below the threshold level of quality. By contrast, in some cases, the content provider stream may be determined to be available when the quality of the connection is at or above the threshold level of quality.

Also, in some cases, the content provider stream may become unavailable, for example, due to various problems at the content provider or due to a decision by the content provider not to transmit the content provider stream. Sometimes, in these scenarios, the content provider may send a notification to the client to indicate, for example, one or more problems or a decision not to transmit the content provider stream. Also, in some cases, the client may determine that the content provider stream is unavailable by determining that the content provider stream and/or certain portions of the content provider stream have not been received within a certain time period.

At operation 818, a state information exchange process with the content provider is initiated or resumed. For purposes of simplification, it is assumed for the particular example of FIG. 8 that state information is exchanged between the client and the content provider when the content provider stream is determined to be available. It is also assumed for the particular example of FIG. 8 that state information is not exchanged between the client and the content provider when the content provider stream is determined to be unavailable. However, it is noted that the criteria for the exchange of state information and the availability of the content provider stream need not necessarily be the same. For example, in some cases, it may be possible to exchange state information between the client and the content provider even when the content provider stream is unavailable to the client. By contrast, in some cases, in some cases, it may not be possible to exchange state information between the client and the content provider even when the content provider stream is available to the client. Also, it is noted that the exchange of state information between client and server is not necessarily required in order to perform multiple stream content presentation techniques or any of the disclosed techniques. In some cases, state information may only be sent from the content provider to the client or may only be sent from the client to the content provider or may not be exchanged at all.

The state information exchange may be initiated, for example, upon an initial performance of operation 818 in association with presentation of the content item, while the state information exchange may be resumed, for example, upon subsequent performances of operation 818 in association with presentation of the content item. As part of operation 818, state information may, for example, be exchanged between the client and the content provider periodically at any desired time or interval. The client and the content provider may, for example, exchange state information simultaneously or using different transmissions to one another at different times. In some cases, the client and the content provider may exchange state information updates, which may, for example, include only state information that was not sent in a previous update or transmission, thereby conserving bandwidth by not re-sending information that was sent previously.

As set forth above, the exchanged state information may include, for example, information associated with various features, events, actions or operations associated with the presentation of a content item. In some cases, state information provided by the client to the content provider may include, for example, state information associated with actions performed by characters or other entities controlled by the client. State information provided by the client to the content provider may also include, for example, state information associated with a user selection of a particular entity for control by the user or a user selection to switch control from one entity to another. State information provided by the client to the content provider may also include, for example, state information associated with various features, events, actions or operations associated with client stream 410 or with any other aspect of the presentation of a content item. By contrast, state information provided by the content provider to the client may include, for example, state information associated with various features, events, actions or operations associated with content provider stream 310 or with any other aspect of the presentation of a content item.

As also set forth above, it is not required that all or almost all collected state information be exchanged between the client and the content provider. In some cases, the client may send to the content provider only state information that is considered to be necessary for the generation of the content provider stream. Similarly, in some cases, the content provider may send to the client only state information that is considered to be necessary for the generation of the client stream.

At operation 819, reception of the content provider stream by the client is initiated or resumed. Reception of the content provider stream may be initiated, for example, upon an initial performance of operation 819 in association with presentation of the content item, while reception of the content provider stream may be resumed, for example, upon subsequent performances of operation 819 in association with presentation of the content item. As set forth above, the content provider stream may include, for example, images or portions of images in association with the presented content item. The content provider stream may be generated based on, for example, information in the content provider content item version in combination with state information associated with presentation of the content item. The state information used to generate the content provider stream may include, for example, state information collected by the content provider throughout the presentation of the content item. Also, the state information used to generate the content provider stream may include, for example, state information received from the client as a result of the state information exchange process with the client discussed above with reference to operation 818.

At operation 820, the client displays images in association with the client stream and the content provider stream. As set forth above, the display of images at operation 820 may include or involve, for example, combining one or more features of each image or other portion of information from the client stream with one or more features of a counterpart image or other portion of information from the content provider stream to form a resulting display image that is displayed at the client. This may include, for example, combining one or more objects from a client stream image with one or more other objects from a counterpart content provider stream image. This may also include, for example, combining one or more features of a version of an object from a client stream image with one or more other features of another version of the object from a counterpart content provider stream image. As described in detail above, in some cases, the client stream may include features of higher importance, while the content provider stream may include features of lower importance. Also, in some cases, the client stream may, for example, include a base feature set, while the content provider stream may, for example, include an optional feature set. The client stream may, for example, include at least enough features such that the client stream alone would allow the content item to be at least temporarily presented without the need to be paused or restarted. In some cases, the client stream may include lower intricacy versions of one or more objects, while the content provider stream may include higher intricacy versions of one or more objects. This may, for example, allow various objects to appear more realistic and/or more detailed when the content provider stream is included in a resulting presentation stream.

At operation 822, the client determines whether the content provider stream has become unavailable. As set forth above, in some cases, the content provider stream may be continually monitored to determine its availability. Also, in some cases, an existing connection between the client and the content provider may be continually monitored to detect disconnections and/or service reductions and problems. Thus, in some cases, the determination at operation 822 may be performed repeatedly for as long as the client is connected to the content provider prior to termination of the presentation of the content item. Some example criteria for determining the availability and/or unavailability of the content provider stream are described in detail above with reference to operation 814 and are not repeated here.

If the content item presentation terminates before the content provider stream becomes unavailable, then, at operation 824, the content item presentation session is terminated. By contrast, if the content provider stream becomes unavailable prior to termination of the content item presentation, then the process proceeds to operation 826, at which the exchange of state information between the client and the content provider and the reception of the content provider stream by the client are at least temporarily stopped. As noted above, however, while the particular example of FIG. 8 assumes that the state information exchange process is stopped when the content provider stream becomes unavailable to the client, this need not necessarily occur in all cases. For example, in some cases, it may be possible to exchange state information between the client and the content provider even when the content provider stream is unavailable to the client.

When the content provider stream is unavailable, the client displays images in association with the client stream at operation 828. As set forth above, the display of images in association with the client stream at operation 828 may include or involve, for example, displaying images or other portions of information from the client stream without combining those images or portions of information with counterpart images or information from the content provider stream. In some cases, however, images or other portions of information from the client stream may be modified before being displayed at the client. As set forth above, the client stream may include at least enough features such that the client stream alone would allow the content item to be at least temporarily presented without the need to be paused or restarted. Thus, for example, when the content provider stream is unavailable, the client stream alone may be sufficient to allow content item presentation to continue until either the content provider stream becomes available or the content item presentation terminates.

At operation 830, the client determines whether the content provider stream has become available. As set forth above, in some cases, the content provider stream may be continually monitored to determine its availability. Also, in some cases, communication links may be continually monitored to detect availability for network connections and network characteristics such as quality of service, available bandwidth and the like. Thus, in some cases, the determination at operation 830 may be performed repeatedly prior to the termination of the presentation of the content item. Some example criteria for determining the availability and/or unavailability of the content provider stream are described in detail above with reference to operation 814 and are not repeated here.

If the content provider stream becomes available prior to termination of the presentation of the content item, then the process proceeds to operation 818. By contrast, if the content item presentation terminates before a sufficient connection to the content provider becomes available, then, at operation 824, the content item presentation session is terminated.

In some scenarios, when the content provider stream is available, the content provider stream may be used to generate resulting images at the client without any further input from or combination with the client stream. For purposes of simplicity, these scenarios may be referred to as a complete content provider stream mode. Thus, for example, when operating in the complete content provider stream mode, operation 820 may be altered such that images are displayed based only on the content provider stream without any input from the client stream. In some cases, the client stream may not be generated during all of portions of time when the client is operating in the complete content provider stream mode. However, in some cases, when operating in the complete content provider stream mode, the client may continue to receive state information from the content provider and/or to exchange state information with the content provider. Receiving state information at the client from the content provider may allow, for example, a seamless or near-seamless state transition when a sufficient connection to the content provider becomes unavailable.

In some cases, to allow for improved operation in the complete content provider stream mode, the content provider stream may include more important features in addition to less important features. In some cases, the content provider may have access to two versions of a particular content item. For example, the content provider may have access to a limited feature content item version for operating in the hybrid stream mode where features from the content provider stream and the client stream are combined. Also, for example, the content provider may have access to a full or extended feature content item version for operating in the complete content provider stream mode where the content provider stream is not combined with the client stream. In some cases, operation may be switched as desired at any time between the hybrid stream mode and the content provider stream mode based on, for example, network conditions, a request from the client or other appropriate reasons.

Additionally, in some cases, certain content provider stream features may be saved by the client. This may, for example, allow the saved content provider stream features to be inserted into subsequent displayed images even after the content provider stream becomes unavailable. For example, a content provider stream image may include a representation of a particular car that is not included in the client stream. The representation of the car may, in some cases, be saved by the client and then inserted into subsequent displayed images after the content provider stream has become unavailable.

Some example content provider procedures in accordance with the disclosed techniques will now be described in detail. In particular, in some cases, the content provider may receive a request from a client to initiate providing of a content provider stream associated with a content item. The request may sometimes indicate that the content provider stream will be combined with a counterpart client stream associated with the content item. However, it is not required that the request expressly indicates that such a combination will be performed. In some cases, the request may include any information sufficient to, at least in part, directly or indirectly trigger a transmission of a content provider stream.

In some cases, upon receiving the request for the content provider stream, the content provider may begin to exchange state information with the client in association with the content item. Some example processes for exchanging state information between the content provider and the client are described in detail above and are not repeated here. In some cases, state information may only be sent from the content provider to the client or may only be sent from the client to the content provider. In some cases, no state information may be exchanged between the client and the content provider. Also, in some cases, upon receiving the request for the content provider stream, the content provider may begin to generate and transmit the content provider stream. Some example processes for generating and transmitting the content provider stream are described in detail above and are not repeated here.

In some cases, the content provider may monitor a connection to the client to detect a disconnection from the client and/or a quality of service associated with the connection. In some cases, when the content provider becomes disconnected from the client, the content provider may at least temporarily stop the generation and/or transmission of the content provider stream. Also, in some cases, the content provider may monitor its communication links to detect a reconnection to the client. In some cases, when the content provider becomes reconnected to the client, the content provider may resume the generation and/or transmission of the content provider stream.

Furthermore, in some cases, when the quality of the connection to the client drops below a threshold level of quality, the content provider may also at least temporarily stop the generation and/or transmission of the content provider stream. When the quality of the connection to the client improves to meet or exceed threshold level of quality, the content provider may resume the generation and/or transmission of the content provider stream.

As set forth above, in some cases, during periods when the content provider has stopped transmitting the content provider stream (or the content provider stream is otherwise unavailable to the client), the client may continue to generate a counterpart client stream that may allow presentation of a content item to at least temporarily continue. In some cases, when transmission of the content provider stream is started or resumed, state information provided by the client may indicate an appropriate point or context at which to start or resume the generation and/or transmission of the content provider stream.

In some cases, the content provider stream may be generated and transmitted to multiple clients. This may occur, for example, when the content provider stream corresponds to a multi-player video game. In some such cases, when a particular client connection is terminated or experiencing poor quality, the content provider may stop transmitting the content provider stream to the particular client and may continue to generate and transmit the content provider stream to other clients.

In some cases, the content provider may determine that, due to technical malfunctions, errors or other problems, it is unable to successfully generate and transmit the content provider stream. In such cases, the content provider may sometimes send a notification to the client to indicate that the content provider stream will not be provided.

Also, in some cases, the content provider may make a decision not to generate and transmit the content provider stream. Such a decision may be made, for example, prior to starting the transmission of the content provider stream or at any point during the transmission of the content provider stream. Such a decision may be made based on any combination of different factors. For example, the content provider may determine that it lacks available resources necessary to start or continue with the generation and transmission of the content provider stream. This may occur, for example, when the generation and transmission of the content provider stream would not allow the content provider to perform one or more higher priority tasks. For example, if a content provider experiences a spike in usage from higher priority clients, then the content provider may decide to offload an existing transmission to a particular lower priority client such that the particular lower priority client at least temporarily displays images from the client stream without combination with the content provider stream. When the content provider makes a decision not to generate and transmit the content provider stream, a notification of the decision may sometimes be sent to the client.

The content provider may also make a decision to start or resume the generation and transmission of the content provider stream. Such a decision may be made, for example, when the content provider determines that resources necessary to start or resume the generation and transmission of the content provider stream have been released from usage by other tasks or otherwise become available.

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A client compute node including memory and storing instructions that, upon execution by the client compute node, cause the client compute node to perform operations comprising:
   generating a client stream including client stream images associated with a presentation of a video game;
   connecting to a content provider using an electronic network;
   receiving, from the content provider, a content provider stream including content provider stream images associated with the presentation of the video game;
   combining at least one feature of a first client stream image with at least one feature of a first content provider stream image to form at least a portion of a first display image;
   displaying the first display image as part of the presentation of the video game;
   detecting that a connection between the content provider and the client has dropped below a threshold level of quality;
   after the detecting:
      stopping the receiving, from the content provider, of the content provider stream; and
      displaying a second display image as part of the presentation of the video game, wherein the second display image includes at least one feature of a second client stream image;
   detecting an increase in the quality of the connection between the content provider and the client above the threshold level of quality; and
   resuming the receiving, from the content provider, the content provider stream.

2. The client compute node of claim 1, wherein state information associated with the video game is exchanged between the client compute node and the content provider, wherein the content provider stream is generated based at least in part on state information received from the client, and wherein the client stream is generated based at least in part on state information received from the content provider.

3. The client compute node of claim 1, wherein features associated with the video game are distributed between the client stream and the content provider stream based at least in part on a level of importance of the features associated with the video game.

4. The client compute node of claim 1, wherein, for an object in the first display image, the first client stream image includes a lower intricacy version of the object and the first content provider stream image includes a higher intricacy version of the object.

5. A computer-implemented method executed by a client compute node for presenting images comprising:
- generating a client stream including information corresponding to client stream features associated with a presentation of content item;
- receiving, from a content provider, a content provider stream including information corresponding to content provider stream features associated with the presentation of the content item;
- displaying a first image as part of the presentation of the content item, wherein the first image includes at least one content provider stream feature;
- detecting that a connection between the content provider and the client has dropped below a threshold level of quality;
- after the detecting:
  - stopping the receiving, from the content provider, of the content provider stream; and
  - displaying a second image as part of the presentation of the content item, wherein the second image includes at least one client stream feature;
- detecting an increase in the quality of the connection between the content provider and the client above the threshold level of quality; and
- resuming the receiving, from the content provider, the content provider stream.

6. The computer-implemented method of claim 5, wherein the first image includes at least one client stream feature.

7. The computer-implemented method of claim 5, wherein the second image includes at least one content provider stream feature.

8. The computer-implemented method of claim 5, wherein the client stream is generated based at least in part on a client version of the content item executed at the client compute node, and wherein the content provider stream is generated based at least in part on a content provider version of the content item executed by the content provider.

9. The computer-implemented method of claim 5, wherein state information associated with the content item is exchanged between the client compute node and the content provider, wherein the content provider stream is generated based at least in part on state information received from the client compute node, and wherein the client stream is generated based at least in part on state information received from the content provider.

10. The computer-implemented method of claim 5, wherein features associated with the content item are distributed between the client stream and the content provider stream based at least in part on a level of importance of the features associated with the content item.

11. The computer-implemented method of claim 5, wherein the client stream features include features associated with an entity within the content item controlled by the client compute node.

12. The computer-implemented method of claim 5, wherein the content provider stream features include features associated with a background portion of the first image.

13. The computer-implemented method of claim 5, wherein, for an object in the first image, the client stream includes a lower intricacy version of the object and the content provider stream includes a higher intricacy version of the object.

14. One or more non-transitory computer-readable storage media having stored thereon instructions that, upon execution one or more compute nodes, cause the one or more compute nodes to perform operations comprising:
- receiving, from a client, a request for transmission of a content provider stream, wherein the content provider stream includes content provider stream images associated with a presentation of content item;
- receiving, from the client, state information indicating a state associated with one or more features of one or more client stream images included in a client stream generated by the client in association with the presentation of the content item;
- generating the content provider stream, wherein one or more of the content provider stream images are generated based at least in part on the state information received from the client;
- transmitting, to the client, the content provider stream for display of at least a portion of one or more of the content provider stream images;
- transmitting, to the client, state information indicating a state associated with one or more features of one or more of the content provider stream images;
- detecting a reduction in a quality of a connection to the client below a threshold level of quality;
- responsively stopping, at least temporarily, the transmitting of the content provider stream to the client;
- detecting an increase in the quality of the connection to the client above the threshold level of quality; and
- resuming the transmitting of the content provider stream to the client.

15. The non-transitory computer-readable storage media of claim 14, wherein at least one feature of a first client stream image is combined with at least one feature of a first content provider stream image to form at least a portion of a first display image.

16. The non-transitory computer-readable storage media of claim 14, wherein the client stream is generated based at least in part on the state information transmitted to the client indicating the state associated with one or more features of one or more of the content provider stream images.

17. The non-transitory computer-readable storage media of claim 14, wherein features associated with the content item are distributed between the client stream and the content provider stream based at least in part on a level of importance of the features associated with the content item.

18. The non-transitory computer-readable storage media of claim 14, wherein a first client stream image includes a lower intricacy version of an object and a first content provider stream image includes a higher intricacy version of the object.

\* \* \* \* \*